United States Patent
Brotman et al.

[11] Patent Number: 5,917,889
[45] Date of Patent: Jun. 29, 1999

[54] CAPTURE OF ALPHABETIC OR ALPHANUMERIC CHARACTER STRINGS IN AN AUTOMATED CALL PROCESSING ENVIRONMENT

[75] Inventors: Lynne Shapiro Brotman, Westfield; Randy G. Goldberg, Princeton, both of N.J.

[73] Assignee: AT&T Corp, Middletown, N.J.

[21] Appl. No.: 08/580,702

[22] Filed: Dec. 29, 1995

[51] Int. Cl.⁶ ............................................. H04M 1/64
[52] U.S. Cl. ............................. 379/88.01; 704/275
[58] Field of Search ..................... 379/67, 88, 89, 379/77, 201, 213, 354, 355, 67.1, 88.01; 395/2, 2.4, 2.6, 2.61, 2.62, 2.63, 2.64, 2.66, 2.79, 2.84; 704/231, 251, 252, 253, 254, 255, 270, 275

[56] References Cited

U.S. PATENT DOCUMENTS

| | | | |
|---|---|---|---|
| Re. 31,188 | 3/1983 | Pirz et al. | 395/2.61 |
| 3,928,724 | 12/1975 | Byram et al. | 395/2.84 |
| 4,355,302 | 10/1982 | Aldefeld et al. | 395/2.52 |
| 4,593,157 | 6/1986 | Usdan | 379/89 |
| 4,608,460 | 8/1986 | Carter et al. | 379/213 |
| 4,649,563 | 3/1987 | Riskin | 379/93.27 |
| 4,650,927 | 3/1987 | James | 379/93.18 |
| 4,782,509 | 11/1988 | Shepard | 379/88 |
| 5,125,022 | 6/1992 | Hunt et al. | 379/88 |
| 5,127,043 | 6/1992 | Hunt et al. | 379/88 |
| 5,131,045 | 7/1992 | Roth | 395/2.46 |
| 5,163,084 | 11/1992 | Kim et al. | 379/88 |
| 5,303,299 | 4/1994 | Hunt et al. | 379/88 |
| 5,384,833 | 1/1995 | Cameron | 395/2.84 |
| 5,392,338 | 2/1995 | Danish et al. | 379/93.27 |
| 5,454,063 | 9/1995 | Rossides | 395/2.84 |
| 5,638,425 | 6/1997 | Meador, III et al. | 379/88 |
| B1 4,427,848 | 8/1994 | Tsakanikas | 379/88 |

*Primary Examiner*—Scott L. Weaver

[57] ABSTRACT

Automated capture of a string of intended alphabetic or alphanumeric characters is provided by using indications of telephone keys respectively selected in accordance with the intended characters and also using signals respectively representing utterances of each of the intended characters to generate selected characters. The telephone key indication is a dual tone multifrequency signal or an utterance representing a number corresponding to the telephone key. A selected character corresponding to one of the telephone key indications is generated based on the utterance signal corresponding to the one telephone key indication.

10 Claims, 2 Drawing Sheets

CAPTURE OF ALPHABETIC OR ALPHANUMERIC CHARACTER STRINGS IN AN AUTOMATED CALL PROCESSING ENVIRONMENT

BACKGROUND OF THE INVENTION

The present invention relates to automated call processing, and, more particularly, is directed to capturing alphabetic or alphanumeric characters in an automated call processing environment.

Automated call processing has achieved widespread usage. Applications include call routing, voice mail, directory assistance, order processing, information dissemination and so forth.

However, existing telephone based services in which a caller is interacting with a computer do not capture alphabetic character strings with a high degree of accuracy when the strings comprise letters which are selected from an unlimited or very large domain, such as names. Since the set of character strings cannot be defined in advance, the string must be spelled as it is captured.

Automatically capturing alphabetic spelled character strings using only voice input is not feasible presently because letter recognition accuracy is too low with available voice recognition technology. For example, it is difficult to automatically distinguish "B" from "P".

Methods of automatically capturing alphabetic spelled character strings using only dual tone multifrequency (DTMF) input from a twelve-key keypad on a telephone set are cumbersome, as each telephone key does not uniquely map to a single alphabetic character. Consequently, multiple inputs per letter are required for disambiguation, e.g., to indicate "K" press "5" twice or press "5", "2". These methods are also error-prone due to the problem of the user accidentally pressing the wrong key or multiple keys and being unaware of the error, the so-called "fat finger" effect.

SUMMARY OF THE INVENTION

Automated capture of a string of intended characters, at least one of which is alphabetic, is provided in accordance with the principles of this invention by using indications of telephone keys respectively selected in accordance with the intended characters and also using signals respectively representing utterances of each of the intended characters to generate selected characters.

In exemplary embodiments, the telephone key indication is a dual tone multifrequency signal or an utterance representing a number corresponding to the telephone key. A selected character corresponding to one of the telephone key indications is generated based on the utterance signal corresponding to the one telephone key indication.

DETAILED DESCRIPTION OF THE PREFERRED EMBODIMENTS

The present invention is related to the invention of U.S. patent application Ser. No. 08/581,716, filed Dec. 29, 1995, the disclosure of which is hereby incorporated by reference.

In an automated call processing scenario, for example, a caller, also referred to herein as a user of the automated call processing system, is assumed to have decided that he or she wishes to enter their name or other alphabetic information to the system, for a purpose such as placing an order or receiving information. In this scenario, the user has available only a conventional telephone set, i.e., any telephone set unable to directly transmit alphabetic information across the telephone network, and communicates via this telephone set with the system.

Figure 1:
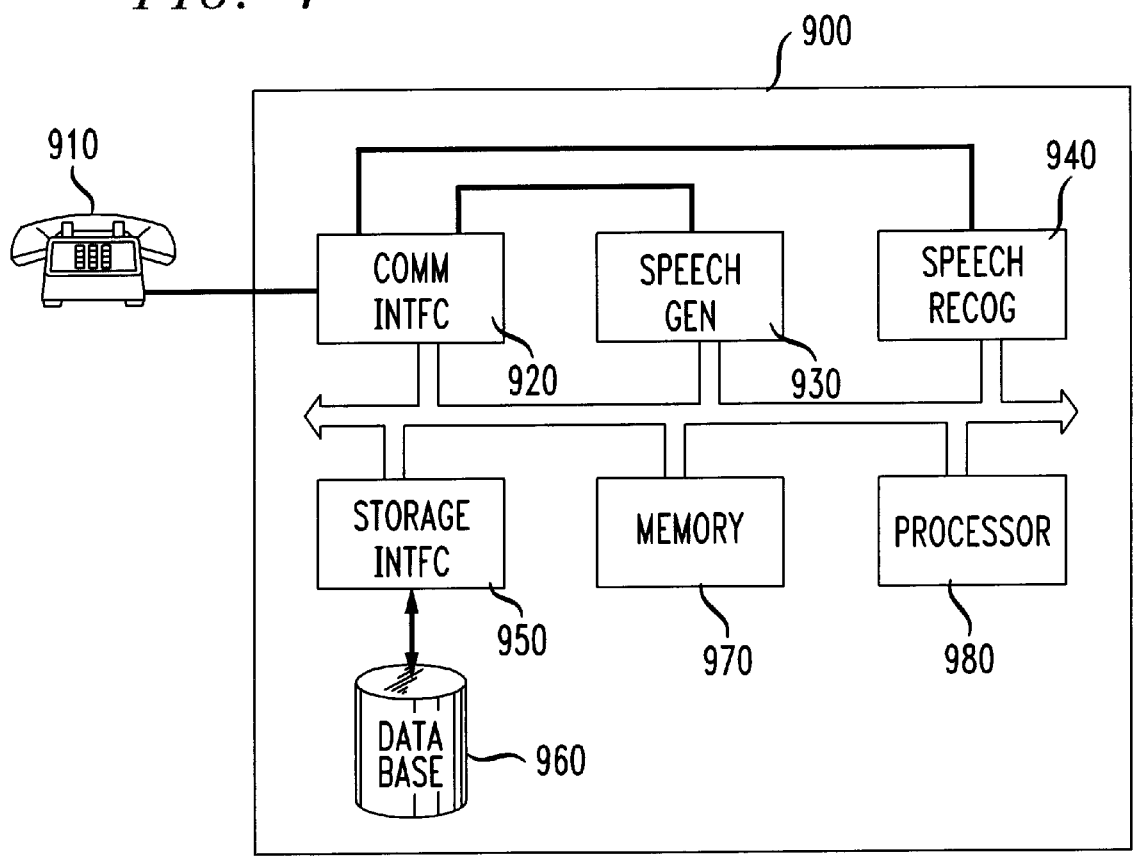
FIG. 1 is a block diagram illustrating a configuration in which the present invention is applied.

Referring now to the drawings, and in particular to FIG. 1, there is illustrated a system 900 in which the present invention is applied. As mentioned, a user is assumed to have access to only a conventional telephone set 910 which communicates with the system 900 using conventional telecommunications facilities such as wired or wireless telecommunications systems known to one of ordinary skill in the art.

The system 900 comprises communications interface (COMM INTFC) 920, speech generation module (SPEECH GEN) 930, speech recognition module (SPEECH RECOG) 940, storage interface (STORAGE INTFC) 950, storage medium 960, memory 970, processor 980 and communications links therebetween.

Communications interface 920 is adapted to receive calls from a user telephone set 910, to supply synthesized speech from speech generation module 930 to the telephone set 910, to forward signals from the telephone set 910 to speech recognition module 940, and to exchange information with processor 980. The system shown in FIG. 1 includes a communications bus and separate communications lines for carrying voiceband signals between the communications interface 920 and each of speech generation module 930 and speech recognition module 940, but one of ordinary skill in the art will appreciate that other configurations are also suitable.

Speech generation module 930 is adapted to receive control commands from processor 980, to generate a voiceband signal in response thereto, and to deliver the generated signal to communications interface 920. Preferably, speech generation module 930 generates synthesized speech in a frequency band of approximately 300–3,300 Hz. In some embodiments, speech generation module 930 may also function to transmit ("play") prestored phrases in response to commands from processor 980; module 930 includes appropriate signal storage facilities in these cases.

Speech recognition module 940 is adapted (i) to receive from communications interface 920 a voiceband signal which can be a speech signal or a DTMF signal generated in response to depression of a key on the telephone set 910, (ii) to process this signal as described in detail below and in response to commands from processor 980, and (iii) to deliver the results of its processing to processor 980. As will be appreciated, in some embodiments speech recognition module 940 includes storage for holding predetermined signals and/or for holding speech signals from telephone set 910 for the duration of a call.

Storage interface 950 is adapted to deliver information to and retrieve information from storage medium 960 in accordance with commands from processor 980. The storage medium 960 may be any appropriate medium, such as magnetic disk, optical disk, tape or transistor arrays.

Memory 970 may be implemented by using, for example, ROM and RAM, and is adapted to store information used by processor 980.

Processor 980 is adapted to execute programs for interacting with the user of telephone set 910 in accordance with a control program typically stored on storage medium 960 and also loaded into memory 970. Processor 980 may also communicate with other systems via communications links (not shown), for example, to retrieve user-specific information from a remote database and/or to deliver information captured from the user of telephone set 910 to a remote database.

In a typical call processing operation, the user employs telephone set 910 to place a call to system 900. Communications interface 920 receives the call and notifies processor 980 of an in-coming call event. Processor 980, in accordance with its control program, instructs speech generation module 930 to generate a speech signal. Speech generation module 930 generates the requested speech signal and delivers the generated signal to communication interface 920, which forwards it to the telephone set 910.

In response to the generated speech signal, the user enters information to system 900 via telephone set 910. As described in detail below, the information can be a speech signal or a DTMF signal generated in response to depression of a key on the telephone set 910.

Communications interface 920 (a) receives the user-generated signal; (b) notifies processor 980 that a signal has been received; and (c) delivers the signal to speech recognition module 940. The module 940 processes the signal in accordance with the present invention, as described in detail below, and delivers the result of its processing to processor 980. Based on this result, processor 980 proceeds through its control program, generally instructing speech generation module 930 to request information from the user or to deliver information to the user, and receiving processed user input from speech recognition module 940.

Entry of alphabetic or alphanumeric information according to the present invention, from the user to the system, will now be described.

Figure 2:
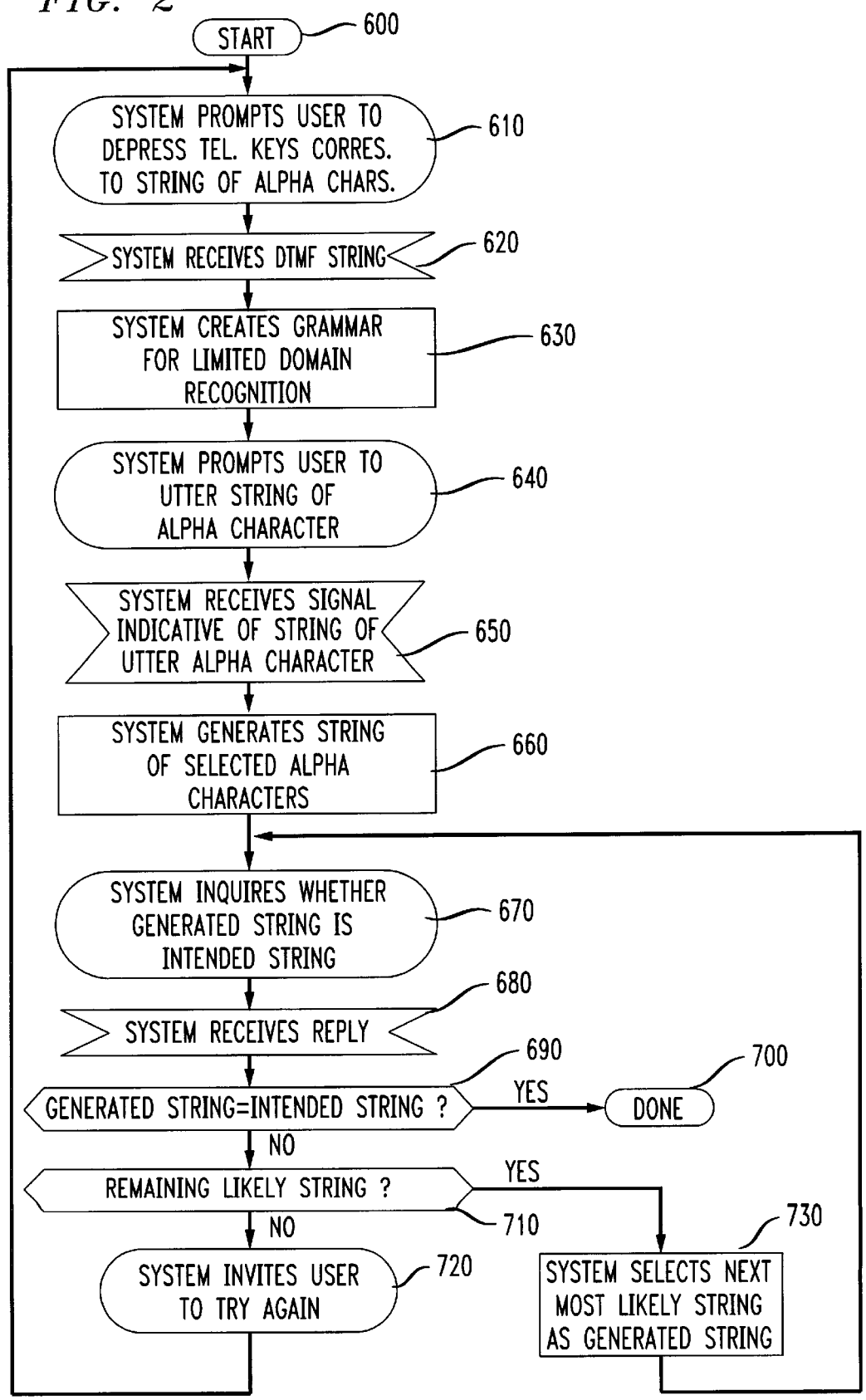
FIG. 2 is a flowchart of a method of automatically capturing an intended alphabetic character string.

Referring now to FIG. 2, there is illustrated a flowchart for a method of automatically capturing an intended alphabetic character string. As used herein and in the claims, "intended" refers to what a user has in mind, irrespective of errors arising from user mistake (e.g., depression of an incorrect telephone key) and/or system mistake (e.g., incorrectly identifying a received signal).

The character string capture method illustrated in FIG. 2 generally involves the caller entering DTMF signals by depressing telephone keys corresponding to the alphabetic characters of the string to be captured, and then the caller utters each character of the string. Alternatively, the caller may speak the number of the telephone key. The DTMF (or spoken number) input indicates to the system how many characters are in the string, and for each character, a limited set of possibilities for that character. For example, if the telephone key for "2" is depressed (or the word "two" is spoken), the set of character possibilities consists of "A", "B" and "C". The system uses grammar rules and the uttered characters to aid in disambiguating the characters of the DTMF (or uttered number) string, generates a string of selected alphabetic characters and presents the generated string to the caller.

If the generated character string is correct, then the system has correctly captured the intended character string. If the generated character string is incorrect, then the system presents its next most probable character string to the user and inquires whether this string is correct. When the system's first generated character string is incorrect, the responses of the user are additional inputs to aid in disambiguating the DTMF (or uttered number) character string.

The flowchart illustrated in FIG. 2 encompasses the actions of the elements shown in FIG. 1. For example, a control and processing program executed by processor 980 will be apparent to one of ordinary skill in the art in view of FIG. 2.

An advantage of this method is that the entire character string is processed together, so information in the string (i.e., its grammar) is available for use in disambiguation.

Another advantage of this method is that it seems faster to the caller than character-by-character capture, since some of the interaction overhead is amortized over the entire string, rather than being incurred for each character.

This method also permits voice recognition technology which has imperfect letter recognition accuracy to be utilized to provide highly accurate capture of an alphabetic character string.

At step 610 of FIG. 2, the system prompts the user to depress a sequence of telephone keys corresponding to a string of alphabetic characters to be input to the system, and at step 620, the system receives the DTMF string corresponding to the sequence of depressed telephone keys. For example, if the character string "GRAND" is to be input, the user depresses the telephone keys "4", "7", "2", "6", "8"; in this example, the last key depression is confused, specifically, "8" was depressed instead of "3". The sequence may be explicitly terminated, such as by entry of the pound (#) key, or implicitly terminated, such as by passage of a time interval greater than a predetermined amount during which no further keys are depressed.

Alternatively, the system prompts the user to utter the numbers of the telephone key sequence, such as "four", "seven", "two", "six", "eight". As mentioned above, presently available voice recognition technology has a high level of accuracy for recognition of single digits, as compared with the level of accuracy for recognition of spoken alphabetic characters.

At step 630, the system uses the received DTMF or uttered number string and creates a grammar for limited domain recognition. For the case of a string consisting of "4", "7", "2", "6", "8", the grammar defines the allowable characters as {G, H, I}, {P, R, S}, {A, B, C}, {M, N, O}, {T, U, V}.

One of ordinary skill in the art will appreciate that creation of the grammar may be delayed until the system generates a character string for presentation to the caller, as described below.

Forward grammar prediction, in which previously entered letters are used to predict subsequently entered letters, and backward grammar prediction, in which subsequently entered letters are used to predict previously entered letters, may be used at this point to generate a set of probable strings. For example, according to forward grammar prediction for the English language, a first character of "G" imparts a likelihood ordering of {R, S, P} to the next character. Initial characters of "G", "R" impart a very high probability to "A" as the third character, and very low probabilities to "B", "C". As another example, according to backward grammar prediction, a fourth character of "N" imparts a likelihood ordering of {A, C, B} to the third character.

At step 640, the system prompts the user to spell the string, that is, to utter the alphabetic characters comprising the string. For example, using speech synthesis techniques known to one of ordinary skill in the art, or using a pre-recorded message, the system tells the user, "Please spell your name."

At step 650, the system receives signals respectively indicative of the uttered alphabetic characters.

At step 660, the system generates a string of selected alphabetic characters which best matches the string entered by the user. In some embodiments, in case of disagreement between the DTMF (or uttered number) string and the uttered alphabetic character string, preference is given to the DTMF string, while in other embodiments, preference is given to the uttered alphabetic character string.

In particular, the system uses the signal representing the uttered characters to disambiguate the DTMF string. For example, after the signal representing the character "gee" is received, the system accesses a subset of stored signals representing spoken alphabetic characters. In particular, the subset comprises stored signals corresponding to only the characters, usually three, indicated by the DTMF input. Thus, the DTMF input is used to restrict the number of stored signals used during pattern matching, resulting in faster and more accurate match processing.

The system compares the received signal with the selected subset of stored signals, selects the stored signal which best matches the received signal, and finds the alphabetic character, "G", corresponding to the best matching stored signal. This alphabetic character is used to select one of the allowable characters {G, H, I}, specifically, the first of the allowable characters.

If the best matching alphabetic character is not one of the allowable characters, the system may look up an alternate best matching alphabetic character, and use this alternate best matching character to select one of the allowable characters. For example, a look up table might list alternates for "G" as "B", "P", "T", "V", "Z".

If not already applied, forward and backward grammar prediction may be used to determine character likelihood. Either the DTMF entries or the signal for the uttered alphabetic characters may be used in predicting the characters intended by the DTMF or uttered character inputs.

Typically, the result of the processing at step 670 is that one string will be found to be more likely than others. However, in some cases multiple strings will be above a predetermined threshold, or appear similarly likely. In the above-described example, if the user depresses the "8" key, corresponding to {"T", "U", "V"}, but utters "DEE" as the corresponding alphabetic character, the strings "GRANT" and "GRAND" are both good candidates for the best matching string. When preference is given to the DTMF string, "GRANT" is selected as the most likely string, also referred to as the generated string of selected alphabetic characters.

At step 670, the system inquires whether the generated string corresponds to the intended string. For example, the system asks the user, "I understood G as in girl, R as in red, A as in apple, N as in nature, T as in top. Is this correct?" It will be appreciated that associating a word with each character, where the first letter of the associated word is the character, assists the user in correctly understanding the system query.

The user replies with, typically, a "yes" or "no" answer, which can be processed by presently available voice recognition technology with a relatively high level of accuracy. At step 680, the system receives the user's reply.

At step 690, the system uses the reply to determine whether the generated string is the intended string. If the generated string matches the intended string, then the system has correctly captured the string and goes on to step 700, completion of string capture.

If the generated string does not match the intended string, then the reply received from the user at step 680 comprises an input used for disambiguation. The system goes on to step 710, at which it determines whether there are any likely strings which it has not yet presented to the user. If no likely strings remain, then appropriate processing occurs. FIG. 2 illustrates the case where appropriate processing comprises inviting the user to try entering the string again at step 720, and then returning to step 610.

If there are likely strings which have not yet been presented to the user, then at step 730, the system selects the next most likely string as the generated string, and returns to step 670 to present this string to the user.

A variation of the method described above with regard to FIG. 2 occurs when the string to be captured comprises alphanumeric characters, such as an account identifier. Here, a more complicated grammar is needed as there are many possible ways of uttering numeric strings.

Let it be assumed that the string to be captured consists of a fixed number of characters, with alphabetic characters in certain positions, numeric characters in other positions and either alphabetic or numeric characters in the remaining positions. For example, the string might be of the form:

A A N N N* where "A" indicates an alphabetic character, "N" indicates a numeric character and "*" indicates either an alphabetic or a numeric character.

As in FIG. 2, the user is assumed to enter the DTMF characters for the account identifier string and also to speak the characters of their account identifier string (steps 600–650). Using the account identifier "AD345M", the user would depress the telephone keys "2", "3", "3", "4", "5", "6", then say, for example, "AY", "DEE", "THREE FORTY FIVE", "EM".

The system generates a string of selected alphanumeric characters in the following manner. For each alphabetic position, the alphabetic characters corresponding to the telephone key depression are selected. For each numeric position, the number corresponding to the telephone key depression is selected. For each position which is either alphabetic or numeric, both the alphabetic characters and the number corresponding to the telephone key depression are selected. In this example, the possibilities are: {A, B, C}, {D, E, F}, {3}, {4}, {5}, {M, N, O, 6}.

Next, the received signals corresponding to the spoken characters are used to select one of the possibilities for each alphabetic key depression. In this example, the received spoken signal "AY" results in selection of "A" as the first character, and the received spoken signal "DEE" results in selection of "D" as the second character.

The received spoken signals for the numeric key depressions are ignored for the moment, that is, the numeric key depressions fully identify the numeric characters. In this example, {3}, {4}, {5} are the numeric characters.

For the characters which are either alphabetic or numeric, the system creates a grammar based on possible ways of uttering these characters. Here, when the last character is numeric, and the preceding three characters are known to be {3}, {4}, {5}, the possible ways of uttering the last four characters include:

THREE FOUR FIVE SIX
   THREE FOUR FIFTY SIX
   THREE FORTY FIVE SIX
   THIRTY FOUR FIVE SIX
   THIRTY FOUR FIFTY SIX
   THREE THOUSAND FOUR HUNDRED FIFTY SIX
   THREE THOUSAND FOUR HUNDRED AND FIFTY
     SIX

THREE FOUR HUNDRED FIFTY SIX
THREE FOUR HUNDRED AND FIFTY SIX
THREE HUNDRED FORTY FIVE SIX
THREE HUNDRED AND FORTY FIVE SIX

When the last character is "M", the possible ways of uttering the last four characters are THREE FOUR FIVE EM
THREE FORTY FIVE EM
THIRTY FOUR FIVE EM
THREE HUNDRED FORTY FIVE EM
THREE HUNDRED AND FORTY FIVE EM The system then compares signals for the possibilities where the last character is alphabetic or numeric, determined as described above, with the received signal ("THREE FORTY FIVE", "EM") and finds the best matching last character (step 660), in this example, {M}.

By allowing for the different ways of uttering the numeric string, recognition accuracy of the alphabetic and alphanumeric character positions is maximized.

It will be appreciated that the recognition work is in distinguishing the alphabetic and alphanumeric character positions. The numeric character positions are, in this example, assumed to be correctly entered.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method of capturing an intended string of characters, at least one of which is alphabetic, comprising the steps of:
   receiving indications of telephone keys respectively selected in accordance with the intended string of characters, wherein each of the telephone key indications is an utterance corresponding to a telephone key;
   receiving utterance signals respectively representing caller utterances of each of the intended characters for disambiguating the received telephone key indications;
   generating a string of selected characters based on the telephone key indications and the utterance signals; and
   determining whether the generated string of characters corresponds to the intended string of characters; wherein when the generated string corresponds to the intended string then the intended string has been correctly captured.

2. The method of claim 1, wherein the telephone key utterance represents a number corresponding to the telephone key.

3. A method of capturing an intended string of characters, at least one of which is alphabetic, comprising the steps of:
   receiving indications of telephone keys respectively selected in accordance with the intended string of characters;
   receiving utterance signals respectively representing caller utterances of each of the intended characters for disambiguating the received telephone key indications;
   generating selected characters based on the telephone key indications and the utterance signals, wherein the step of generating includes choosing each of the selected characters corresponding to each of the telephone key indications based on utterance signals corresponding to previously received telephone key indications; and
   determining whether the generated string of characters corresponds to the intended string of characters; wherein when the generated string corresponds to the intended string then the intended string has been correctly captured.

4. A method of capturing an intended string of characters, at least one of which is alphabetic, comprising the steps of:
   receiving indications of telephone keys respectively selected in accordance with the intended characters for disambiguating the received telephone key indications;
   receiving utterance signals respectively representing caller utterances of each of the characters;
   generating selected characters based on the telephone key indications and the utterance signals, wherein the step of generating includes choosing each of the selected characters corresponding to each of the telephone key indications based on utterance signals corresponding to subsequently received telephone key indications; and
   determining whether the generated string of characters corresponds to the intended string of characters; wherein when the generated string corresponds to the intended string then the intended string has been correctly captured.

5. A method of capturing an intended string of characters, at least one of which is alphabetic, comprising the steps of:
   receiving indications of telephone keys respectively selected in accordance with the intended string of characters, wherein the string has a predetermined number of character positions and the character at each position is specified by a respective format identifying said character as one of alphabetic only, numeric only or alphanumeric;
   receiving utterance signals respectively representing caller utterances of each of the intended characters for disambiguating the received telephone key indications;
   generating selected characters based on the telephone key indications and the utterance signals; and
   determining whether the generated string of characters corresponds to the intended string of characters; wherein when the generated string corresponds to the intended string then the intended string has been correctly captured.

6. Apparatus for capturing an intended string of characters, at least one of which is alphabetic, comprising:
   means for receiving indications of telephone keys respectively selected in accordance with the intended characters, wherein the telephone key indication is an utterance corresponding to a telephone key;
   means for receiving utterance signals respectively representing caller utterances of each of the intended characters for disambiguating the received telephone key indications;
   means for generating selected characters based on the telephone key indications and the utterance signals; and
   means for determining whether the generated string of characters corresponds to the intended string of characters; wherein when the generated string corresponds to the intended string then the intended string has been correctly captured.

7. The apparatus of claim 6, wherein the telephone key utterance represents a number corresponding to the telephone key.

8. Apparatus for capturing an intended string of characters, at least one of which is alphabetic, comprising:

means for receiving indications of telephone keys respectively selected in accordance with the intended characters;

means for receiving utterance signals respectively representing caller utterances of each of the intended characters for disambiguating the received telephone key indications;

means for generating selected characters based on the telephone key indications and the utterance signals, wherein the means for generating includes means for choosing selected characters corresponding to the telephone key indications based on utterance signals corresponding to previously received telephone key indications; and means for determining whether the generated string of characters corresponds to the intended string of characters; wherein when the generated string corresponds to the intended string then the intended string has been correctly captured.

9. Apparatus for capturing an intended string of characters, at least one of which is alphabetic, comprising:

means for receiving indications of telephone keys respectively selected in accordance with the intended characters;

means for receiving utterance signals respectively representing caller utterances of each of the intended characters for disambiguating the received telephone key indications; and means for generating selected characters based on the telephone key indications and the utterance signals, wherein the means for generating includes means for choosing selected characters corresponding to the telephone key indications based on utterance signals corresponding to subsequently received telephone key indications; and means for determining whether the generated string of characters corresponds to the intended string of characters; wherein when the generated string corresponds to the intended string then the intended string has been correctly captured.

10. Apparatus for capturing a string of characters, at least one of which is alphabetic, comprising:

means for receiving indications of telephone keys respectively selected in accordance with the intended characters wherein the string has a predetermined number of character positions and the character at each position is specified by a respective format identifying said character as one of alphabetic only, numeric only or alphanumeric;

means for receiving utterance signals respectively representing caller utterances of each of the intended characters;

means for generating selected characters based on the telephone key indications and the utterance signals; and determining whether the generated string of characters corresponds to the intended string of characters; wherein when the generated string corresponds to the intended string then the intended string has been correctly captured.

* * * * *